(No Model.)
J. DONOVAN.
CAR BRAKE.
No. 511,198. Patented Dec. 19, 1893.
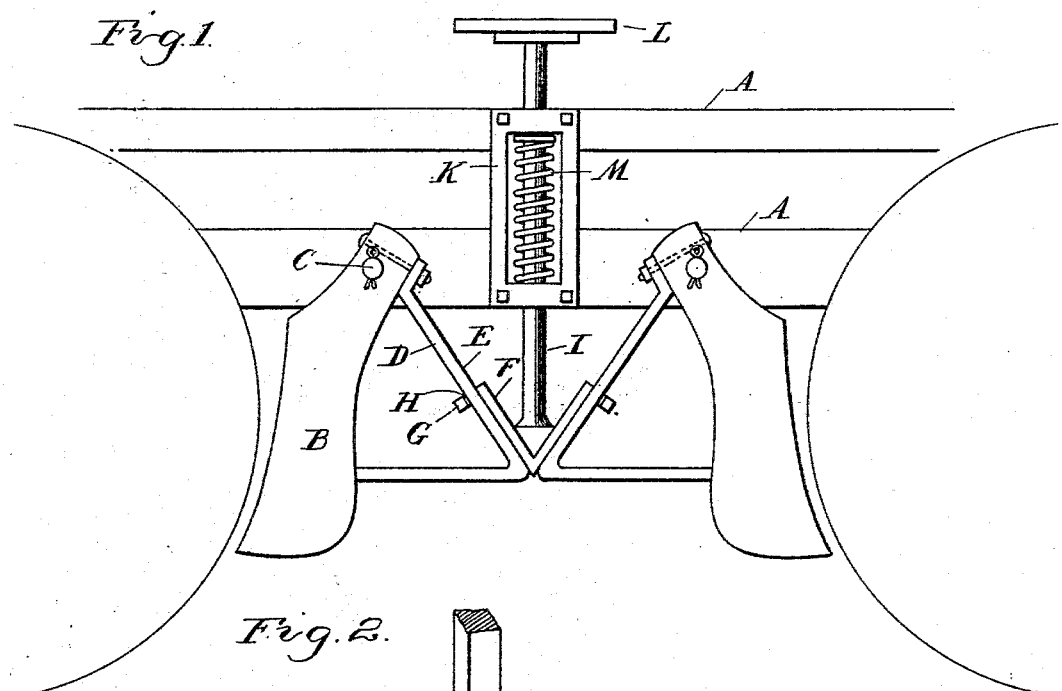
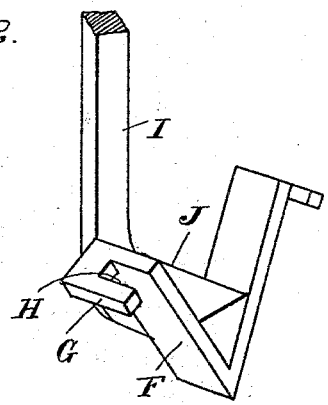
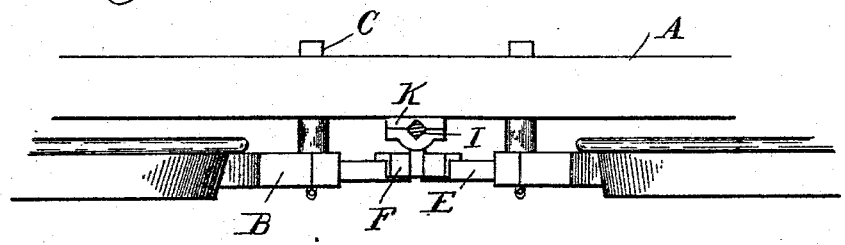
Witnesses
A. L. Hobbie
Inventor
James Donovan.
By
Thos. S. Sprague & Son
Attys

UNITED STATES PATENT OFFICE.

JAMES DONOVAN, OF THREE RIVERS, MICHIGAN, ASSIGNOR TO ROBERTS, THROP & CO., OF SAME PLACE.

CAR-BRAKE.

SPECIFICATION forming part of Letters Patent No. 511,198, dated December 19, 1893.

Application filed July 8, 1893. Serial No. 479,914. (No model.)

*To all whom it may concern:*

Be it known that I, JAMES DONOVAN, a citizen of the United States, residing at Three Rivers, in the county of St. Joseph and State of Michigan, have invented certain new and useful Improvements in Brakes, of which the following is a specification, reference being had therein to the accompanying drawings.

The invention consists in the peculiar construction of the brake shoes and of the operating device therefor, and further in the peculiar construction and arrangement of the various parts.

In the drawings, Figure 1 is a side elevation of my improved brake as applied to a hand car. Fig. 2 is a detached perspective view of the actuating wedge and foot bar. Fig. 3 is a plan view of the brake, the step of the foot bar being removed.

A is the frame of the hand car.

B are the brake shoes.

C are bolts from which the brake shoes are pivotally suspended from the sides of the car. The brake shoes are oppositely arranged to brake the inner faces of both wheels in one side of the car simultaneously as is usual in such constructions.

D are brackets having the upper inclined faces E, the faces on the two brackets being oppositely inclined to form between them a bearing opposite substantially the middle portion of the actuating part of the shoe.

F is a wedge.

G are flanges at each side thereof having guide grooves H in which the inclined bar of the brackets engage.

I is a foot bar preferably rectangular in cross section and having the offset J at its lower end, at the outer end of which is formed the wedge. This foot bar slidingly engages in bearings formed in a bracket K secured to the side of the frame of the car between the wheels.

L is a step formed at the upper end of the bar extending above the platform in convenient proximity to the platform so that the operator may step upon it to operate the brakes.

M is a coiled spring sleeved about the foot bar bearing with its lower end against the bracket and at its upper end against a key or flange N on the foot bar.

The parts being thus constructed their operation is as follows: In the normal position of the parts, the tension of the spring M holds the wedge in its initial or upper position, shown in Fig. 1, in which position the shoes are drawn back from the wheels by the engagement of the inclined bar of the bracket in the guide grooves H. When the operator presses down upon the step the foot bar and wedge are lowered and as the wedge lowers its inclined faces bear against the inclined faces E of the bracket and cause the brake shoes to turn about their pivots C and be forcibly pressed upon the faces of the car wheels, thereby effectually braking the same. As soon as the operator releases his foot from the foot bar the spring M returns the parts to their normal position.

What I claim as my invention is—

1. In a hand car, the combination of the suspended brake shoes, brackets secured thereto having oppositely inclined upper faces, a foot bar for operating the shoes and a wedge on the bar adapted to bear against the inclined faces of the brackets, substantially as described.

2. In a hand car brake, the combination of the suspended brake shoes, the bracket secured thereto, having oppositely inclined upper faces, a wedge between the brackets engaging therewith, guide bearings in the wedge with which the inclined bars of the bracket engage, a bar for actuating the wedge and a spring for retracting the same, substantially as described.

3. In a hand car brake, the combination of the suspended brake shoes, the brackets secured thereto having oppositely inclined upper faces, a wedge adapted to engage upon said faces and having guide grooves engaging inclined bars of the brackets, a rectangular foot bar carrying the wedge at the lower end, a bracket having corresponding rectangular bearings for the foot bar, a step at the upper end of the foot bar and a spring sleeved about the foot bar, the parts combined and operating, substantially as and for the purpose described.

In testimony whereof I affix my signature in presence of two witnesses.

JAMES DONOVAN.

Witnesses:
J. E. BUNN,
GEO. KELLER.